United States Patent
Tajima et al.

(10) Patent No.: US 9,451,544 B2
(45) Date of Patent: Sep. 20, 2016

(54) BASE STATION, RADIO TERMINAL AND RADIO COMMUNICATION SYSTEM

(71) Applicant: FUJITSU LIMITED, Kawasaki-shi, Kanagawa (JP)

(72) Inventors: Yoshiharu Tajima, Yokohama (JP); Yoshiaki Ohta, Yokohama (JP); Akira Ito, San Jose, CA (US); Katsumasa Sugiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 14/321,345

(22) Filed: Jul. 1, 2014

(65) Prior Publication Data

US 2014/0313978 A1    Oct. 23, 2014

Related U.S. Application Data

(63) Continuation of application No. PCT/JP2012/050148, filed on Jan. 6, 2012.

(51) Int. Cl.
*H04W 52/02* (2009.01)
*H04W 48/10* (2009.01)
*H04W 76/04* (2009.01)

(52) U.S. Cl.
CPC ....... *H04W 52/0216* (2013.01); *H04W 76/045* (2013.01); *H04W 48/10* (2013.01); *H04W 52/0222* (2013.01); *H04W 76/046* (2013.01); *H04W 76/048* (2013.01)

(58) Field of Classification Search
None
See application file for complete search history.

(56) References Cited

U.S. PATENT DOCUMENTS

| | | | |
|---|---|---|---|
| 2003/0174675 A1 | 9/2003 | Willenegger et al. | |
| 2006/0056426 A1* | 3/2006 | Wakameda | H04L 12/5692 370/401 |
| 2008/0095037 A1* | 4/2008 | Chang | H04B 7/15542 370/204 |

(Continued)

FOREIGN PATENT DOCUMENTS

| | | |
|---|---|---|
| AU | 2003220298 | 9/2003 |
| CA | 2479121 | 9/2003 |

(Continued)

OTHER PUBLICATIONS

KROA—Korean Office Action issued on Aug. 11, 2015 for corresponding Korean Patent Application No. 10-2014-7018331, with English translation.

(Continued)

*Primary Examiner* — Min Jung
(74) *Attorney, Agent, or Firm* — Fujitsu Patent Center

(57) ABSTRACT

When completing radio communication with a radio terminal, a transmitting unit of a base station transmits to the radio terminal a validity period of control information on radio communication which has been used to communicate with the radio terminal. When starting radio communication with the radio terminal within the validity period, a communication unit of the base station performs radio communication with the radio terminal without performing a process of exchanging control information. When completing radio communication with the base station, a receiving unit of the radio terminal receives a validity period from the base station. When starting radio communication with the base station within the validity period, a communication unit of the radio terminal performs radio communication with the radio terminal without performing a process of exchanging control information.

9 Claims, 16 Drawing Sheets

(56) References Cited

U.S. PATENT DOCUMENTS

| | | | | |
|---|---|---|---|---|
| 2009/0233637 A1* | 9/2009 | Yoshizawa | ............ | H04H 60/13 455/515 |
| 2009/0279466 A1 | 11/2009 | Ji et al. | | |
| 2010/0042738 A1* | 2/2010 | Kim | ........................ | H04L 67/32 709/230 |
| 2010/0197303 A1 | 8/2010 | Joko et al. | | |
| 2011/0110303 A1* | 5/2011 | Bahr | .................... | H04W 40/24 370/328 |
| 2011/0319110 A1 | 12/2011 | Futaki | | |
| 2013/0010768 A1 | 1/2013 | Lee et al. | | |
| 2013/0095767 A1 | 4/2013 | Tajima et al. | | |
| 2016/0127979 A1* | 5/2016 | Choi | ..................... | H04W 48/12 370/329 |

FOREIGN PATENT DOCUMENTS

| | | |
|---|---|---|
| EP | 2139259 A1 | 12/2009 |
| JP | 2008-211372 | 9/2008 |
| JP | 2008-306384 | 12/2008 |
| JP | 2010-093823 | 4/2010 |
| JP | 2010-136337 | 6/2010 |
| JP | 2010-268512 | 11/2010 |
| KR | 20100004066 | 1/2010 |
| KR | 20110118814 | 11/2011 |
| WO | 03/079576 | 9/2003 |
| WO | 2008/105299 | 9/2008 |
| WO | 2010/104143 | 9/2010 |
| WO | 2011/087288 A2 | 7/2011 |
| WO | 2011/158377 A1 | 12/2011 |

OTHER PUBLICATIONS

3GPP TR 25.913 V7.3.0 (Mar. 2006), 3rd Generation Partnership Project; Technical Specification Group Radio Access Network; Requirements for Evolved UTRA (E-UTRA) and Evolved UTRAN (E-UTRAN) (Release 7).

3GPP TR 36.913 V8.0.1 (Mar. 2009), 3rd Generation Partnership Project; Technical Specification Group Radio Access Network; Requirements for further advancements for Evolved Universal Terrestrial Radio Access (E-UTRA) (LTE-Advanced) (Release 8).

International Search Report, mailed in connection with PCT/JP2012/050148 and mailed Feb. 7, 2012.

EESR—European Search Report issued on Jan. 8, 2016 in corresponding to European Application No. 12864614.8.

* cited by examiner

| OK | 1 | MEASUREMENT CONDITION |

FIG. 12

BASE STATION, RADIO TERMINAL AND RADIO COMMUNICATION SYSTEM

CROSS-REFERENCE TO RELATED APPLICATION

This application is a continuation application of International Application PCT/JP2012/050148 filed on Jan. 6, 2012 which designated the U.S., the entire contents of which are incorporated herein by reference.

FIELD

The present invention relates to a base station, a radio terminal, a radio communication system, and a radio communication method that perform radio communication.

BACKGROUND

A cellular communication system has become the mainstream of mobile communication systems for mobile phones and the like. The cellular communication system covers a wide area that includes a plurality of areas (cells), each of which is a communication range of a base station. With this system, when a radio terminal moves between cells, the radio terminal switches between base stations so as to continue communication.

Today, the 3rd generation mobile telecommunication services based on a CDMA (Code Division Multiple Access) system, a W-CDMA (Wideband-CDMA) system, and the like are available. In the meantime, the next generation mobile telecommunication system that enables higher-speed communication has been extensively studied. In the 3rd Generation Partnership Project (3GPP), LTE-Advanced (LTE-A) is under study. LTE-A is an improved version of LTE which has been in use since around 2010 (see, for example, 3GPP TR25.913 V7.3.0 and 3GPP TR36.913 V8.0.1)

In recent years, with the spread of smartphones and the like, the characteristics of data handled in radio communication have become more diverse. In addition to conventional voice communication and browsing on the World Wide Web (WWW), the use of instant messaging (IM), social networking services (SNSs), and the like is increasing. Further, smartphones often perform data communication on IM and SNSs in background without being directly operated by the user.

In data communication on IM, SNSs, and the like using radio terminals such as smartphones, small-size data is intermittently transmitted and received. In the 3GPP, an effective method for handling these data communication characteristics different from those of the conventional voice communication and browsing on the WWW is being studied. In particular, how to perform intermittent transmission and reception of small-size data with low power consumption, without reducing the throughput, is being studied.

In the interval during which no data is exchanged, it is preferable that a radio terminal be switched to an RRC (Radio Resource Control) idle state (standby state).

However, intermittent data communication of small-size data involves frequent switching between an RRC connected state (communicating state) and an idle state. This results in an increased amount of RRC signaling and hence an increased power consumption.

For example, it is assumed that small packets are intermittently transmitted from a base station to a radio terminal. In this case, the radio terminal frequently switches between an RRC connected state (communicating state) and an idle state, so that the amount of RRC signaling increases. Therefore, the power consumed by the radio terminal increases.

SUMMARY

According to an aspect of the embodiments, there is provided a base station that performs radio communication with a radio terminal, the base station including: a transmitting unit configured to, when completing radio communication with the radio terminal, transmit to the radio terminal a validity period of control information on radio communication which has been used to communicate with the radio terminal; and a communication unit configured to, when starting radio communication with the radio terminal within the validity period, start radio communication with the radio terminal without performing a process of exchanging the control information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a first diagram illustrating an example of difference information.

DESCRIPTION OF EMBODIMENTS

Embodiments of the present invention will be explained below with reference to the accompanying drawings.

First Embodiment

Figure 1:
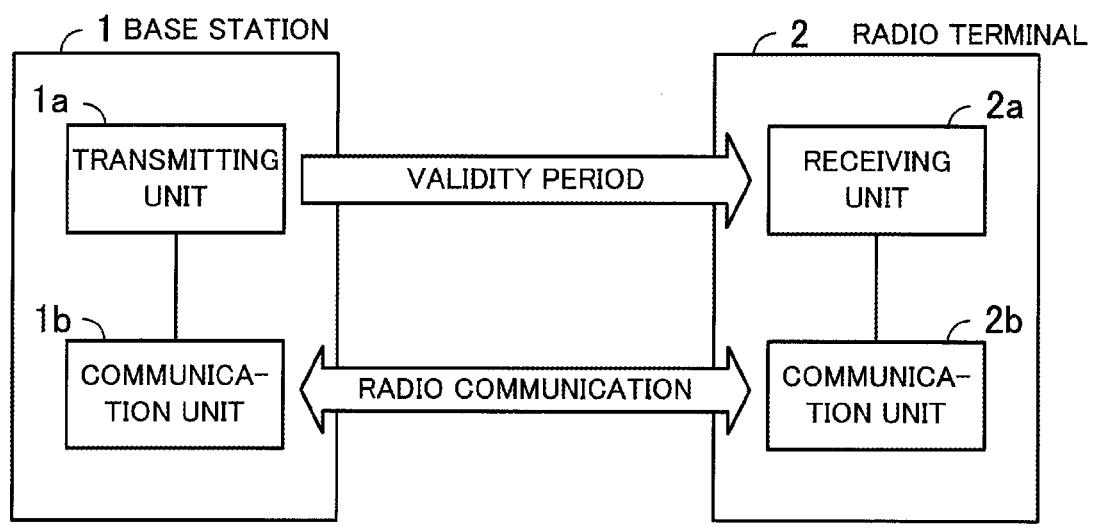
FIG. 1 illustrates a radio communication system according to a first embodiment.

FIG. 1 illustrates a radio communication system according to a first embodiment. As illustrated in FIG. 1, a radio communication system includes a base station 1 and a radio terminal 2. The base station 1 includes a transmitting unit 1a and a communication unit 1b. The radio terminal 2 includes a receiving unit 2a and a communication unit 2b.

The transmitting unit 1a of the base station 1 is configured to, when completing radio communication with the radio terminal 2, transmit to the radio terminal 2 a validity period of control information on radio communication which has been used to communicate with the radio terminal 2.

The control information may be RRC parameters, for example. When completing radio communication with the radio terminal 2, the transmitting unit 1a transmits to the radio terminal 2 a validity period, such as, for example, 5 minutes, of RRC parameters.

The communication unit 1b is configured to, when starting radio communication with the radio terminal 2 within the validity period, start radio communication with the radio terminal 2 without performing a process of exchanging control information.

For example, in the case of the above example, if 5 minutes have not elapsed from the completion of the previous radio communication, the communication unit 1b starts radio communication with the radio terminal 2 without performing a process of exchanging RRC parameters (for example, a process of exchanging RRC parameters in a normal RRC connection).

Note that, if the validity period has not expired, the communication unit 1b performs radio communication with the radio terminal 2, using the RRC parameters used for the previous radio communication. On the other hand, if the validity period has expired, the communication unit 1b exchanges RRC parameters (for example, exchanges RRC parameters in a normal RRC connection) with the radio terminal 2, and then communicates with the radio terminal 2 using the RRC parameters.

The receiving unit 2a of the radio terminal 2 is configured to, when completing radio communication with the base station 1, receive from the base station 1 a validity period of control information on radio communication which has been used to communicate with the base station 1. That is, the receiving unit 2a receives a validity period transmitted from the transmitting unit 1a of the base station 1.

The communication unit 2b is configured to, when starting radio communication with the base station 1 within the validity period received by the receiving unit 2a, start radio communication with the base station 1 without performing a process of exchanging control information.

Here, it is assumed that the control information is RRC parameters, as mentioned above. Further, it is assumed that the validity period received by the receiving unit 2a is 5 minutes. In this case, if 5 minutes have not elapsed from the completion of the previous radio communication, the communication unit 2b starts radio communication with the base station 1 without performing a process of exchanging RRC parameters.

Note that, if the validity period has not expired, the communication unit 2b performs radio communication with the base station 1, using the RRC parameters used for the previous radio communication. On the other hand, if the validity period has expired, the communication unit 2b exchanges RRC parameters (for example, exchanges RRC parameters in a normal RRC connection) with the base station 1, and then communicates with the base station 1 using the RRC parameters.

In this manner, the base station 1 is configured to, when completing radio communication with the radio terminal 2, transmit to the radio terminal 2 a validity period of control information on radio communication which has been used to communicate with the radio terminal 2. Further, the base station 1 is configured to, when starting radio communication with the radio terminal 2 within the validity period, start radio communication with the radio terminal 2 without performing a process of exchanging control information with the radio terminal 2. The radio terminal 2 is configured to, when completing radio communication with the base station 1, receive from the base station 1 a validity period of control information on radio communication which has been used to communicate with the base station 1. Further, the radio terminal 2 is configured to, when starting radio communication with the base station 1 within the validity period, start radio communication with the base station 1 without performing a process of exchanging control information with the base station 1.

Accordingly, when starting radio communication within a validity period, the base station 1 and the radio terminal 2 do not perform a process of exchanging control information. This allows the radio terminal 2 to reduce the amount of signaling involved in the process of exchanging control informal, and thus to reduce power consumption.

Second Embodiment

Next, a second embodiment will be described in detail with reference to the accompanying drawings.

Figure 2:
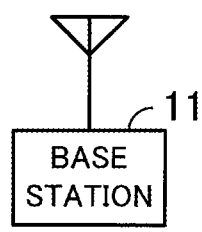
FIG. 2 illustrates a radio communication system according to a second embodiment.
Figure 2:
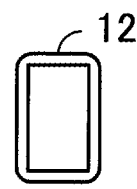

FIG. 2 illustrates a radio communication system according to the second embodiment. As illustrated in FIG. 2, a radio communication system includes a base station 11 and a radio terminal 12. The base station 11 and the radio terminal 12 perform radio communication in accordance with a radio communication standard, such as LTE-A, LTE, and so on, for example.

The radio terminal 12 may be a smartphone or a mobile phone, for example. Prior to providing a detailed description of the base station 11 and the radio terminal 12, an RRC connection will be described.

Figure 3:
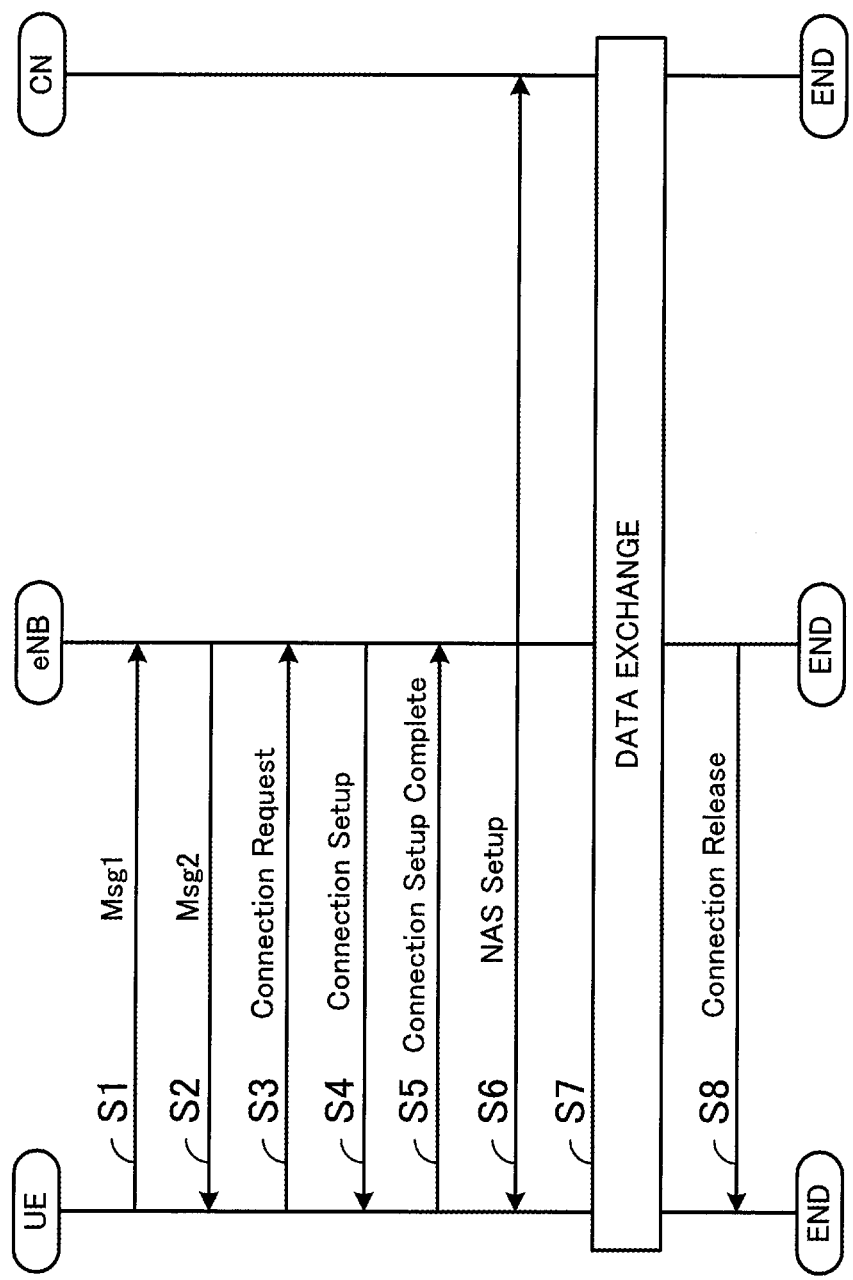
FIG. 3 is a sequence diagram illustrating an RRC connection.

FIG. 3 is a sequence diagram illustrating an RRC connection.

(Step S1) A radio terminal (UE (User Equipment) in FIG. 3) performs a random access (Msg1 (Message 1)) to a base station (eNB (e Node B) in FIG. 3) so as to establish a radio link with the base station.

(Step S2) The base station returns to the radio terminal a response (Msg2) to the random access.

(Step S3) The radio terminal transmits a Connection Request to the base station so as to establish an RRC connection.

(Step S4) The base station returns to the radio terminal a response (Connection Setup) to the Connection Request for an RRC connection. The base station also transmits RRC parameters to the radio terminal. The RRC parameters include a Cell-Radio Network Temporary Identifier (C-RNTI) for identifying the radio terminal and information on the measurement.

(Step S5) Having received the Connection Setup from the base station, the radio terminal transmits a Connection Setup Complete to the base station. Thus, an RRC connection is established between the base station and the radio terminal.

(Step S6) The radio terminal and a core network apparatus (CN (Core Network) in FIG. 3) perform a Non Access Stratum (NAS) setup via the base station so as to enable data exchange between the radio terminal and the core network apparatus. The NAS setup is for performing secrecy processing between the radio terminal and the core network apparatus and the like, for example.

(Step S7) Upon completion of the NAS setup, the radio terminal and the core network apparatus start data exchange.

(Step S8) Upon completion of the data exchange between the radio terminal and the core network apparatus, the base station transmits a Connection Release to the radio terminal so as to release the RRC connection. Upon release of the RRC connection, the radio terminal is switched to the idle state.

In the following, intermittent data communication of small packets will be described. A conventional base station and a conventional radio terminal establish and release an RRC connection, and set and release RRC parameters each time the base station and radio terminal perform intermittent packet communication. Therefore, the radio terminal has an increased amount of RRC signaling and hence an increased power consumption.

On the other hand, in the radio communication system of FIG. 2, if the validity period of the RRC parameters has not expired, radio communication is performed using the RRC parameters used for the previous radio communication, without exchanging RRC parameters. This allows the radio terminal 12 to reduce the amount of RRC signaling, and thus to reduce power consumption, in intermittent data communication of small packets.

Figure 4:
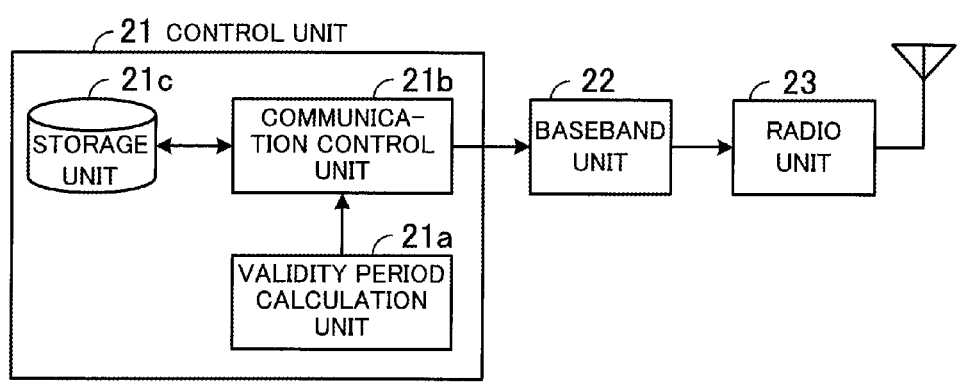
FIG. 4 is a block diagram illustrating a base station.

FIG. 4 is a block diagram illustrating the base station. As illustrated in FIG. 4, the base station 11 includes a control unit 21, a baseband unit 22, and a radio unit 23. The control unit 21 includes a validity period calculation unit 21a, a communication control unit 21b, and a storage unit 21c. The control unit 21 corresponds to, for example, the transmitting unit 1a and the communication unit 1b of FIG. 1.

The validity period calculation unit 21a calculates a validity period of RRC parameters. For example, the validity period calculation unit 21a calculates a validity period in accordance with the location of the radio terminal 12 in the cell of the base station 11.

More specifically, the validity period calculation unit 21a sets a longer validity period if the radio terminal 12 is located in the center of the cell, and sets a shorter validity period if the radio terminal 12 is located at the edge of the cell. This is because, if the radio terminal 12 is at the edge of the cell, the radio terminal 12 is highly likely to move to the cell of the adjacent base station, and therefore it is preferable to release RRC parameters. Further, the validity period calculation unit 21a may calculate the validity period taking into consideration the moving speed and direction of the radio terminal 12.

The radio terminal 12 is able to determine its location using GPS (Global Positioning System), for example. Further, the radio terminal 12 is able to determine its moving speed and direction using an accelerometer, for example. The validity period calculation unit 21a receives location information from the radio terminal 12, and thus is able to determine the location of the radio terminal 12 in the cell. Further, the validity period calculation unit 21a receives the moving speed and direction from the radio terminal 12, and thus is able to determine the moving speed and direction of the radio terminal 12.

Alternatively, the validity period calculation unit 21a may output a validity period of a constant length. For example, the validity period calculation unit 21a may output a constant validity period, such as 5 minutes or the like, regardless of the location and the moving speed and direction of the radio terminal 12.

When completing radio communication with the radio terminal 12, the communication control unit 21b transmits to the radio terminal 12 the validity period calculated (output) by the validity period calculation unit 21a. That is, when completing radio communication with the radio terminal 12, the communication control unit 21b transmits to the radio terminal 12 the validity period of RRC parameters used for the radio communication with the radio terminal 12.

Further, when starting radio communication with the radio terminal 12 within the validity period, the communication control unit 21b starts radio communication with the radio terminal 12 without performing a process of exchanging RRC parameters. Then, the communication control unit 21b performs radio communication with the radio terminal 12, using the RRC parameters used for the previous radio communication (RRC parameters stored in the storage unit 21c).

Note that the validity period is transmitted to the radio terminal 12 via the baseband unit 22 and the radio unit 23. Further, communication with the radio terminal 12 using RRC parameters is performed via the baseband unit 22 and the radio unit 23.

The storage unit 21c stores RRC parameters that are generated when establishing an RRC connection. The storage unit 21c also stores RRC parameters used for the previous radio communication.

The baseband unit 22 performs baseband processing on data to be transmitted to the radio terminal 12. The baseband unit 22 also performs baseband processing on data received from the radio terminal 12.

The radio unit 23 performs radio processing on data to be transmitted to the radio terminal 12. For example, the radio unit 23 converts the frequency of data to be transmitted to the radio terminal 12 into a radio frequency. The radio unit 23 also performs radio processing on data received from the radio terminal 12. For example, the radio unit 23 converts the frequency of data received from the radio terminal 12 into a baseband frequency.

Figure 5:
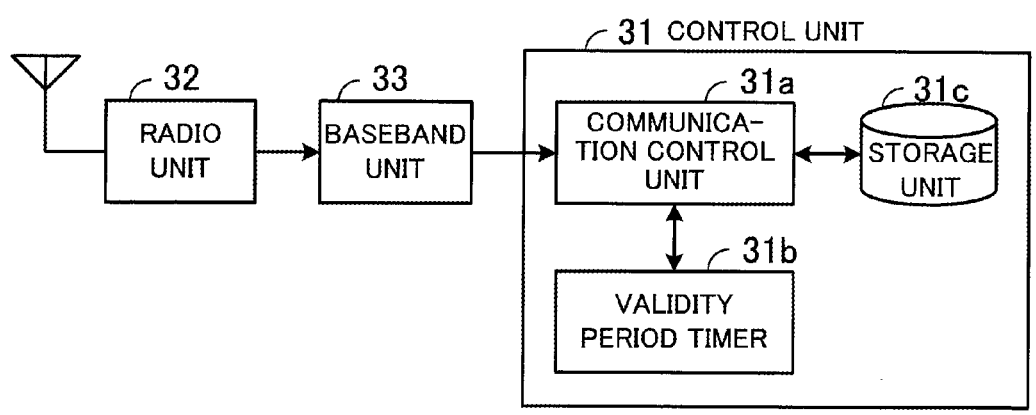
FIG. 5 is a block diagram illustrating a radio terminal.

FIG. 5 is a block diagram illustrating the radio terminal. As illustrated in FIG. 5, the radio terminal 12 includes a control unit 31, a radio unit 32, and a baseband unit 33. The control unit 31 includes a communication control unit 31a, a validity period timer 31b, and a storage unit 31c. The control unit 31 corresponds to, for example, the receiving unit 2a and the communication unit 2b of FIG. 1.

When completing radio communication with the base station 11, the communication control unit 31a receives from the base station 11 a validity period of RRC parameters used for the radio communication with the base station 11. The communication control unit 31a sets, for the validity period timer 31b, the received validity period. Note that the communication control unit 31a receives the validity period via the radio unit 32 and the baseband unit 33.

After completion of radio communication, when the validity period expires, the validity period timer 31b notifies the communication control unit 31a of the expiration of the validity period. For example, the validity period timer 31b reduces the validity period set by the communication control unit 31a in increments of one. When the validity period reaches 0, the validity period timer 31b notifies the communication control unit 31a of the expiration of the validity period.

The storage unit 31c stores RRC parameters that are generated when establishing an RRC connection. The storage unit 31c also stores RRC parameters used for the previous radio communication.

When starting radio communication with the base station 11 within the validity period, the communication control unit 31a starts radio communication with the base station 11 without performing a process of exchanging RRC parameters. Then, the communication control unit 31a performs radio communication with the base station 11, using the RRC parameters stored in the storage unit 31c. For example, the communication control unit 31a sets a validity period in the validity period timer 31b. Then, if a notification indicating that the timer value has reached 0 is not received from the validity period timer 31b, the communication control unit 31a performs radio communication with the base station 11, using the RRC parameters stored in the storage unit 31c. Note that the communication control unit 31a performs radio communication with the base station 11 via the baseband unit 33 and the radio unit 32.

Figure 6:
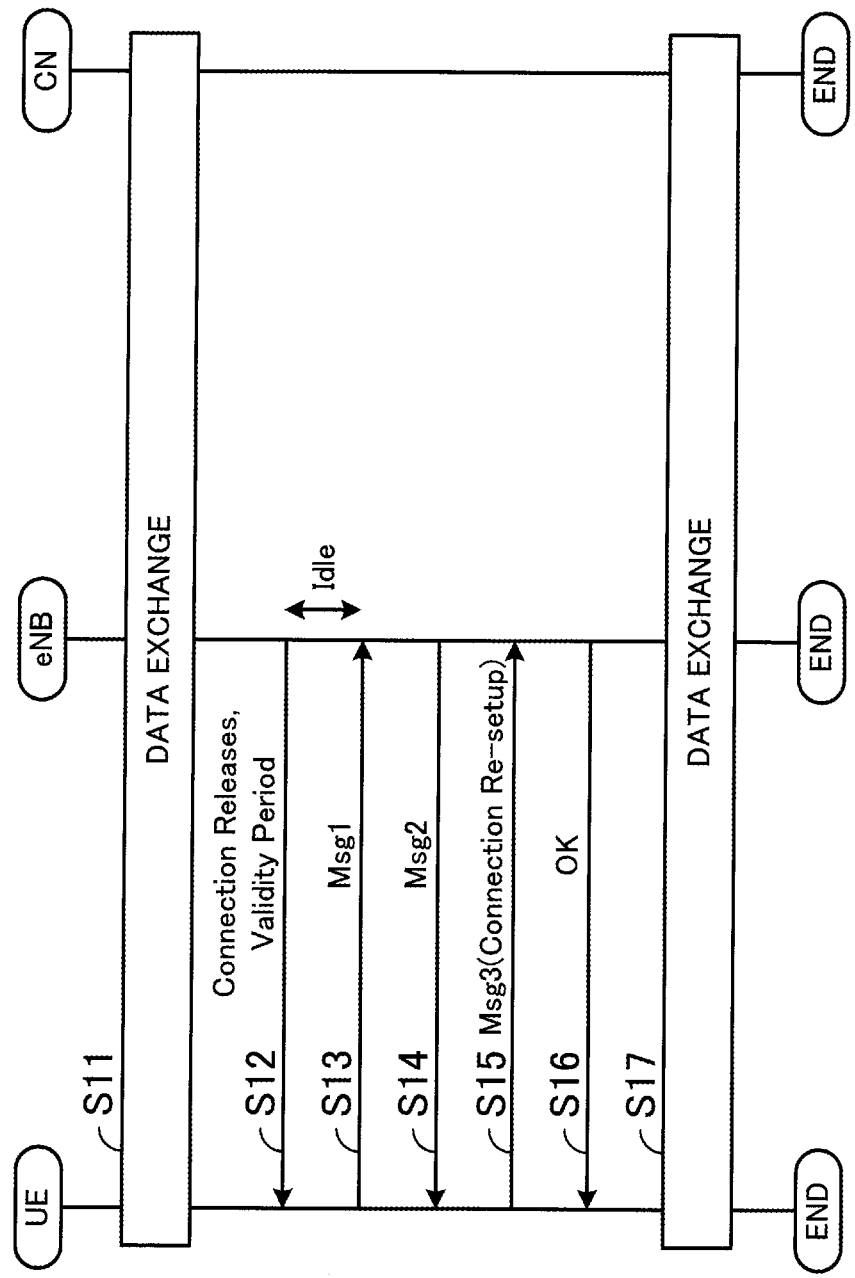
FIG. 6 is a sequence diagram illustrating data communication.

FIG. 6 is a sequence diagram illustrating data communication. In FIG. 6, a UE corresponds to the radio terminal 12, and an eNB corresponds to the base station 11.

(Step S11) The radio terminal 12 and the core network apparatus exchange data.

(Step S12) When the data exchange between the radio terminal 12 and the core network apparatus completes, the validity period calculation unit 21a of the base station 11 calculates a validity period of the RRC parameters.

Further, when the data exchange between the radio terminal 12 and the core network apparatus completes, the communication control unit 21b transmits a Connection Release to the radio terminal 12. The communication control unit 21b also transmits to the radio terminal 12 the validity period calculated by the validity period calculation unit 21a.

The communication control unit 31a of the radio terminal 12 sets, for the validity period timer 31b, the validity period received from the base station 11.

(Step S13) The communication control unit 31a performs a random access (Msg1) to the base station 11 so as to perform data communication with the core network apparatus.

Note that it is assumed that the validity period has not expired. That is, it is assumed that the communication control unit 31a has not received information indicating expiration of the validity period from the validity period timer 31b.

(Step S14) The communication control unit 21b of the base station 11 returns a response (Msg2) to the random access.

(Step S15) Having received the response to the random access from the base station 11, the communication control unit 31a transmits a Connection Re-setup (Msg3) to the base station 11.

Note that in the case where the validity period has expired, the communication control unit 31a transmits a Connection Request so as to establish an RRC connection to the base station 11 (for example, step S3 of FIG. 3). In the sequence of FIG. 6, it is assumed that the validity period has not expired (step S13). Accordingly, the communication control unit 31a performs re-setup of connection (re-setup of an RRC connection), instead of transmitting a Connection Request.

That is, when starting radio communication with the base station 11 within the validity period, the communication control unit 31a transmits a Connection Re-setup to the base station 11 so as to perform communication using the RRC parameters stored in the storage unit 31c.

(Step S16) The communication control unit 21b of the base station 11 returns to the radio terminal 12 a response (OK) to the Connection Re-setup. Note that the communication control unit 21b does not transmit RRC parameters to the radio terminal 12.

(Step S17) The radio terminal 12 and the core network apparatus exchange data via the base station 11.

In this step, the communication control unit 21b of the base station 11 performs radio communication with the radio terminal 12, using the RRC parameters used for the previous radio communication (step S11) and stored in the storage unit 21c. Further, the communication control unit 31a of the radio terminal 12 performs radio communication with the base station 11, using the RRC parameters used for the previous radio communication (step S11) and stored in the storage unit 31c.

In this manner, if the validity period has not expired, the base station 11 and the radio terminal 12 perform radio communication, using RRC parameters used for the previous radio communication, without performing a process of exchanging RRC parameters. This allows the base station 11 and the radio terminal 12 to reduce the amount of signaling between the base station 11 and the radio terminal 12, and thus allows the radio terminal 12 to reduce power consumption.

Figure 7:
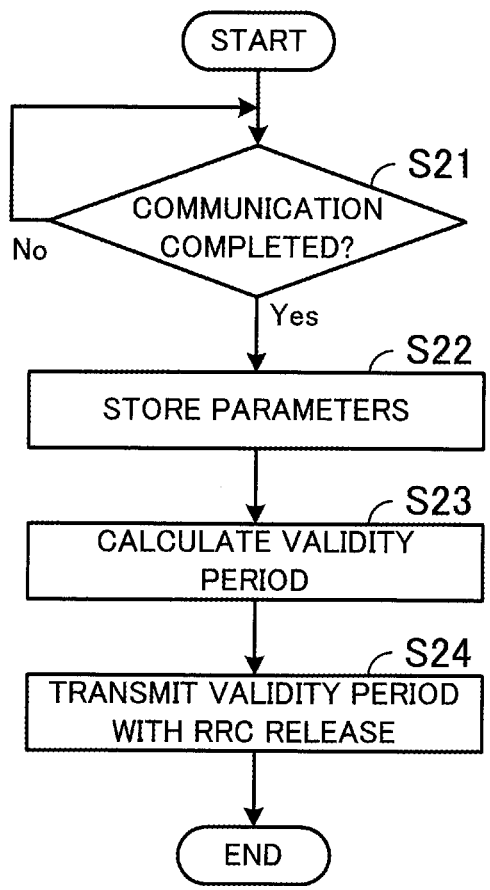
FIG. 7 is a flowchart of a process performed by the base station when completing data communication.

FIG. 7 is a flowchart of a process performed by the base station when completing data communication.

(Step S21) The communication control unit 21b determines whether data communication between the radio terminal 12 and the core network apparatus is completed. If the communication control unit 21b determines that data communication is completed, the process proceeds to step S22.

(Step S22) The communication control unit 21b stores, in the storage unit 21c, RRC parameters used for radio communication with the radio terminal 12.

(Step S23) The validity period calculation unit 21a calculates a validity period of the RRC parameters.

(Step S24) The communication control unit 21b transmits to the radio terminal 12 the validity period calculated by the validity period calculation unit 21a, together with a Connection Release (RRC Release) for the RRC connection.

Figure 8:
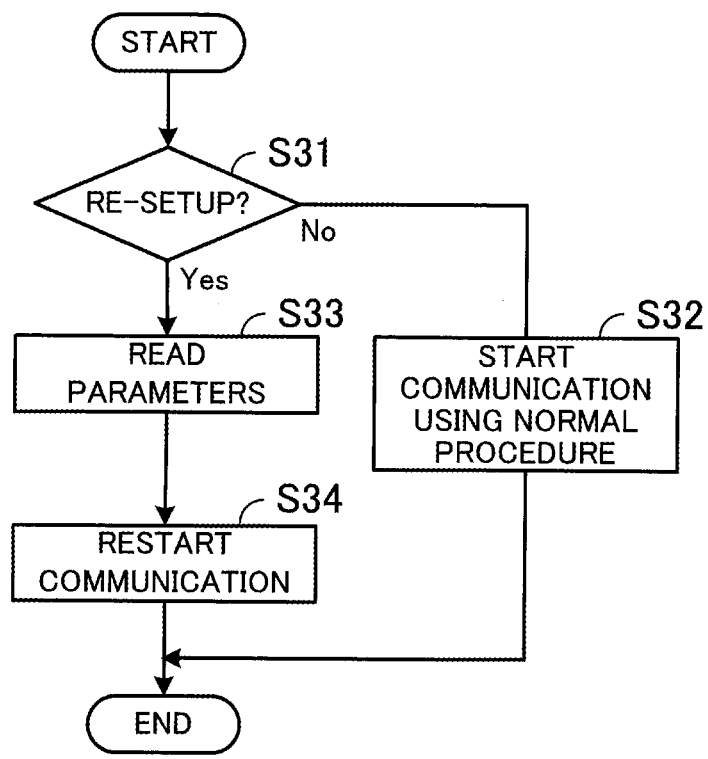
FIG. 8 is a flowchart of a process performed by the base station when restarting data communication.

FIG. 8 is a flowchart of a process performed by the base station when restarting data communication.

(Step S31) The communication control unit 21b determines whether a Connection Re-setup is received from the radio terminal 12. If the communication control unit 21b determines that a Connection Re-setup is not received (for example, if a Connection Request is received), the process proceeds to step S32. If the communication control unit 21b determines that a Connection Re-setup is received, the process proceeds to step S33.

Note that in the case of restarting communication within the validity period notified by the base station 11, the radio terminal 12 transmits a Connection Re-setup to the base station 11. On the other hand, in the case of restarting communication after expiration of the validity period notified by the base station 11, the radio terminal 12 transmits a Connection Request to the base station 11.

(Step S32) The base station 11 starts communication with the radio terminal 12 using a normal procedure. That is, the base station 11 establishes an RRC connection to the radio terminal 12, in accordance with the sequence illustrated in FIG. 3, and restarts communication.

(Step S33) The communication control unit 21b reads RRC parameters used for the previous communication from the storage unit 21c.

(Step S34) The communication control unit 21b restarts communication with the radio terminal 12, using the RRC parameters read from the storage unit 21c.

Figure 9:
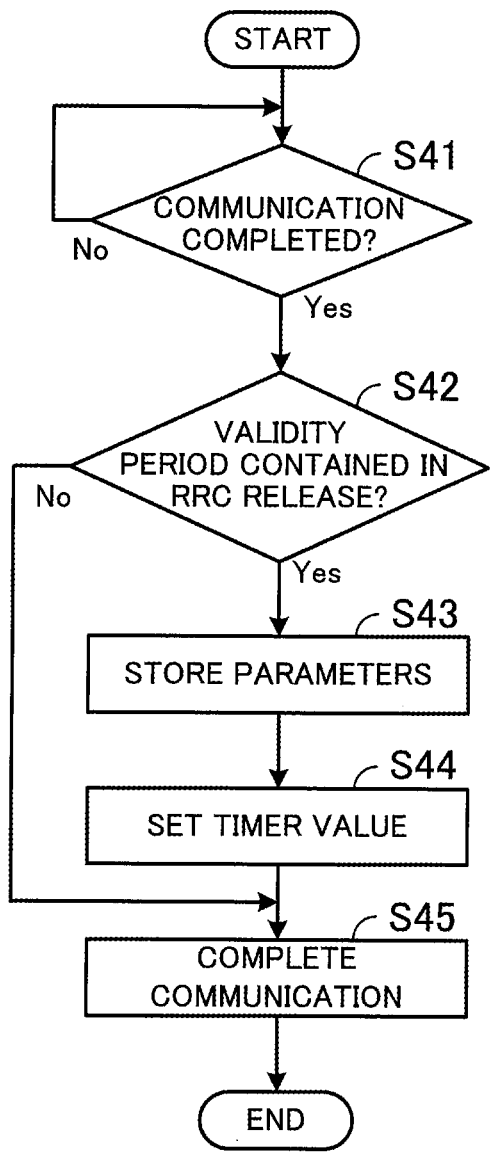
FIG. 9 is a flowchart of a process performed by the radio terminal when completing data communication.

FIG. 9 is a flowchart of a process performed by the radio terminal when completing data communication.

(Step S41) The communication control unit 31a determines whether data communication with the core network apparatus is completed. If the communication control unit 31a determines that data communication is completed, the process proceeds to step S42.

(Step S42) The communication control unit 31a determines whether a validity period is contained in a Connection Release (RRC Release) received from the base station 11. If the communication control unit 31a determines that a validity period is contained in the Connection Release, the process proceeds to step S43. If the communication control unit 31a determines that a validity period is not contained in the Connection Release, the process proceeds to step S45.

Note that a validity period is not contained in a Connection Release in the case where the base station 11 does not have a function of calculating a validity period or a function of continuing to use RRC parameters used for the previous connection, for example.

(Step S43) The communication control unit 31a stores, in the storage unit 31c, RRC parameters used for radio communication with the base station 11.

(Step S44) The communication control unit 31a sets, for the validity period timer 31b, the validity period received in step S42.

(Step S45) The communication control unit 31a completes radio communication with the base station 11. Thus, the radio terminal 12 is switched to the idle state.

Figure 10:
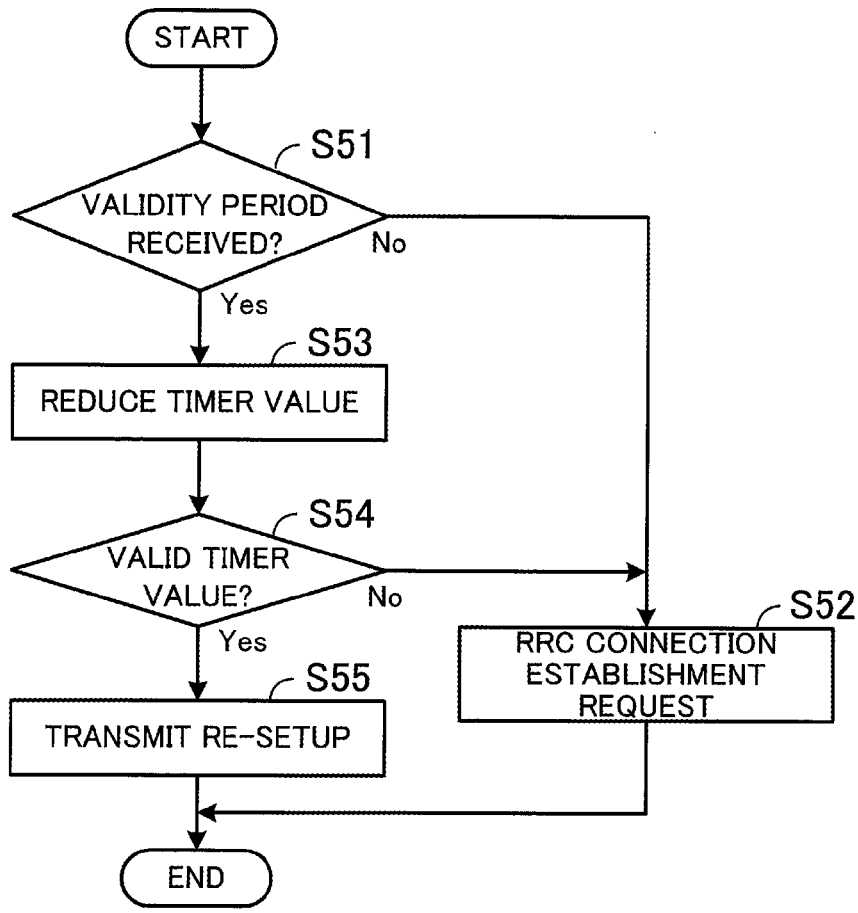
FIG. 10 is a flowchart of a process performed by the radio terminal when restarting data communication.

FIG. 10 is a flowchart of a process performed by the radio terminal when restarting data communication.

(Step S51) The validity period timer 31b determines whether a validity period is received together with a Connection Release by the communication control unit 31a. For example, the validity period timer 31b determines whether a validity period is received by the communication control unit 31a in step S42 of FIG. 9. If the validity period timer 31b determines that a validity period is not received together with the Connection Release by the communication control unit 31a, the process proceeds to step S52. If the validity period timer 31b determines that a validity period is received together with the Connection Release by the communication control unit 31a, the process proceeds to step S53.

(Step S52) The communication control unit 31a requests the base station 11 to establish an RRC connection. That is, the communication control unit 31a transmits a Connection Request to the base station 11.

(Step S53) The validity period timer 31b reduces the validity period set by the communication control unit 31a. For example, the validity period timer 31b subtracts 1 from the set value.

(Step S54) The validity period timer 31b determines whether the set value (timer value) is valid. For example, if the set value is not 0, the validity period timer 31b determines that the timer value is valid. If the validity period timer 31b determines that the timer value is valid, the process proceeds to step S55. If the validity period timer 31b determines that the timer value is invalid, the process proceeds to step S52.

(Step S55) The communication control unit 31a transmits a Connection Re-setup to the base station 11. Note that the communication control unit 31a performs radio communication with the base station 11, using the RRC parameters stored in the storage unit 31c.

In this manner, when communication is completed, the base station 11 transmits a validity period to the radio terminal 12. In the case of restarting radio communication with the base station 11 within the validity period, the radio terminal 12 transmits a Connection Re-setup requesting to restart radio communication using RRC parameters used for the previous radio communication. Then, the base station 11 and the radio terminal 12 perform radio communication, using the RRC parameters used for the previous radio communication, without performing a process of exchanging RRC parameters.

This allows the base station 11 and the radio terminal 12 to reduce the amount of signaling for exchanging RRC parameters, and thus allows the radio terminal 12 to reduce power consumption, when restarting radio communication.

Further, the base station 11 and the radio terminal 12 may handle NAS parameters in the same manner as RRC parameters described above. For example, the base station 11 and the radio terminal 12 store NAS parameters together with RRC parameters in the storage units 21c and 31c, respectively, and use the previous NAS parameters for the current radio communication if the validity period has not expired. This allows the base station 11 and the radio terminal 12 to reduce the amount of signaling for setting up a NAS, and thus allows the radio terminal 12 to reduce power consumption, when restarting radio communication.

Note that the base station 11 and the radio terminal 12 retain RRC parameters in the storage units 21c and 31c, respectively, during the validity period. Accordingly, if the base station 11 needs to start radio communication with the radio terminal 12, the base station 11 may specify the radio terminal 12 using a C-RNTI contained in the RRC parameters and issue a request to start communication.

For example, in the sequence of FIG. 6, the radio terminal 12 issues a communication request (performs a random access) to the base station 11 in step S13. However, if the base station 11 needs to issue a communication request to the radio terminal 12, the base station 11 may transmit a Msg0 to the radio terminal 12 before step S13 of FIG. 6. For example, the base station 11 may transmit a C-RNTI assigned to the radio terminal 12 in a Msg0 so as to specify the radio terminal 12 and start radio communication with the radio terminal 12.

Having received the Msg0 from the base station 11, the radio terminal 12 performs processing of step S13 and the subsequent steps of FIG. 6. However, the processing of steps S15 and S16 are omitted. That is, if the communication control unit 31a of the radio terminal 12 receives a Msg0 from the base station 11 within the validity period, the communication control unit 31a does not transmit a Connection Re-setup to the base station 11. Further, if the communication control unit 21b of the base station 11 transmits a Msg0 to the radio terminal 12 within the validity period, the communication control unit 21b performs communication with the radio terminal 12 using RRC parameters, without receiving a Connection Re-Setup from the radio terminal 12.

Third Embodiment

Next, a third embodiment will be described in detail with reference to the accompanying drawings. In the second embodiment, the base station 11 and the radio terminal 12 store RRC parameters in the storage units 21c and 31c, respectively, after completion of communication. Then, if the validity period has not expired, the base station 11 and the radio terminal 12 restart communication, using the RRC parameters stored in the storage units 21c and 31c, respectively.

However, the content of the RRC parameters at the time of restarting communication may differ from the content of the RRC parameters at the time of the previous communication. In view of this, in the third embodiment, if there is a difference in the RRC parameters, the base station 11 transmits the difference, as difference information, to the radio terminal 12. The radio terminal 12 updates the RRC parameters stored in the storage unit 31c, based on the difference information received from the base station 11. Then, the base station 11 and the radio terminal 12 restart communication, based on the updated new RRC parameters.

Note that the radio communication system of the third embodiment is the same as that of FIG. 2, and hence a description thereof will be omitted.

Further, the base station 11 is the same as that illustrated in the block diagram of FIG. 4, but the processing performed by the communication control unit 21b is different. The communication control unit 21b of the third embodiment compares RRC parameters for the current radio communication to be performed within the validity period and the RRC parameters used for the previous radio communication and stored in the storage unit 21c. Then, the communication control unit 21b extracts the difference in the RRC parameters, and transmits the difference, as difference information, to the radio terminal 12. That is, if a set of the RRC parameters used for the previous radio communication and a set of the RRC parameters to be used for the current radio communication differ from each other, the communication control unit 21b transmits to the radio terminal 12 information that differs between the two sets of RRC parameters. Note that if there is no difference information, the communication control unit 21b transmits to the radio terminal 12 information indicating that there is no difference information. Further, if there is no difference information, the communication control unit 21b performs radio communication with the radio terminal 12, using the RRC parameters used for the previous radio communication and stored in the storage unit 21c.

The radio terminal 12 is the same as that illustrated in the block diagram of FIG. 5, but the processing performed by the communication control unit 31a is different. The communication control unit 31a of the third embodiment receives, as difference information, the difference of the RRC parameters for the current radio communication to be performed within the validity period from the RRC parameters used for the previous radio communication, from the base station 11. The communication control unit 31a updates the RRC parameters stored in the storage unit 31c with the received difference information so as to generate RRC parameters for the current radio communication. Note that if there is no difference information on the RRC parameters, the communication control unit 31a receives from the base station 11 information indicating that there is no difference information. In this case, the communication control unit 31a performs radio communication with the base station 11, using the RRC parameters stored in the storage unit 31c without making any change.

Figure 11:
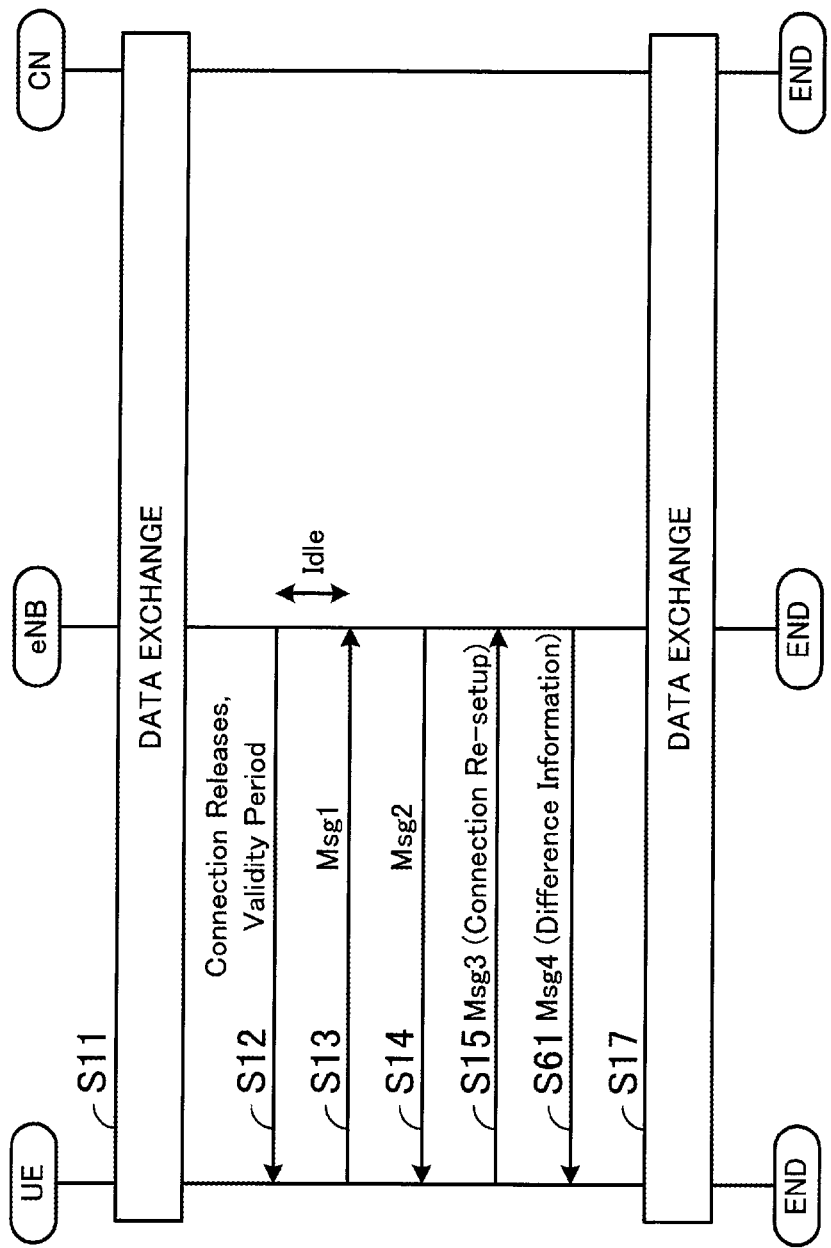
FIG. 11 is a sequence diagram according to a third embodiment.

FIG. 11 is a sequence diagram according to the third embodiment. In FIG. 11, the same steps as those of FIG. 6 are denoted by the same step numbers.

The sequence of FIG. 11 differs from the sequence of FIG. 6 in the processing of step S16. The processing of steps S11 through S15 and S17 of FIG. 11 are the same as the processing of steps S11 through S15 and S17 of FIG. 6, and a description thereof will be omitted.

(Step S61) The communication control unit 21b of the base station 11 extracts, as difference information, the difference between the RRC parameters used for the previous radio communication (data exchange in step S11) and the RRC parameters to be used for the current radio communication. It is assumed herein that there is difference information on the RRC parameters. The communication control unit 21b transmits to the radio terminal 12 the difference information on the RRC parameters in a Msg4.

The communication control unit 31a of the radio terminal 12 updates the RRC parameters stored in the storage unit 31c with the received difference information so as to generate RRC parameters for the current radio communication (data exchange in step S17).

Figure 12:
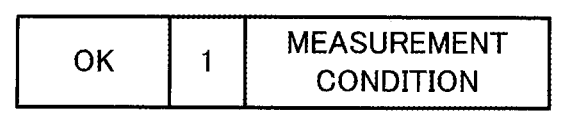

FIG. 12 is a first diagram illustrating an example of difference information. More specifically, FIG. 12 illustrates an example of difference information transmitted from the base station 11 to the radio terminal 12. The difference information illustrated in FIG. 12 is transmitted from the base station 11 to the radio terminal 12 in a Msg4 (step S61 of FIG. 11).

As mentioned above, the RRC parameters include a C-RNTI and measurement information. The measurement information indicates the measurement conditions of the radio status of adjacent base stations, and is transmitted from the base station 11 to the radio terminal 12. The radio terminal 12 measures the radio status of the adjacent base stations in accordance with the received measurement information (measurement conditions), and transmits the measurement results to the base station 11.

For example, it is assumed that, for the previous radio communication, RRC parameters including a measurement condition 1, a measurement condition 2, and a measurement condition 3 are transmitted from the base station 11 to the radio terminal 12. Further, it is assumed that, for the current communication, the measurement condition 1 is changed.

In this case, as illustrated in FIG. 12, the communication control unit 21b of the base station 11 transmits to the radio terminal 12 a value "1" indicating the measurement condition 1 that is changed, and "measurement information" indicating the changed content. Note that "OK" in FIG. 12 indicates the response to a Connection Re-setup (step S15 of FIG. 11) from the radio terminal 12.

Having received the difference information of FIG. 12, the communication control unit 31a of the radio terminal 12 changes the measurement condition 1 of the measurement information included in the RRC parameters stored in the storage unit 31c. That is, the communication control unit 31a changes the measurement condition 1 so as to reflect the content of the measurement condition indicated by the received difference information. Note that the communication control unit 31a does not change the other parameters of the RRC parameters.

Figure 13:
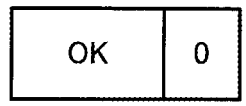
FIG. 13 is a second diagram illustrating an example of difference information.

FIG. 13 is a second diagram illustrating an example of difference information. More specifically, FIG. 13 illustrates an example in the case where there is no difference information on the RRC parameters.

As illustrated in FIG. 13, in the case where there is no difference information on the RRC parameters, the communication control unit 21b of the base station 11 transmits to the radio terminal 12 "OK" indicating the response to a Connection Re-setup and "0" indicating there is no change in the measurement conditions.

Note that, as described above, the measurement conditions include the measurement condition 1, the measurement condition 2, and the measurement condition 3, for example. Accordingly, "0" of FIG. 13 indicates that there is no change in the measurement conditions.

Figure 14:
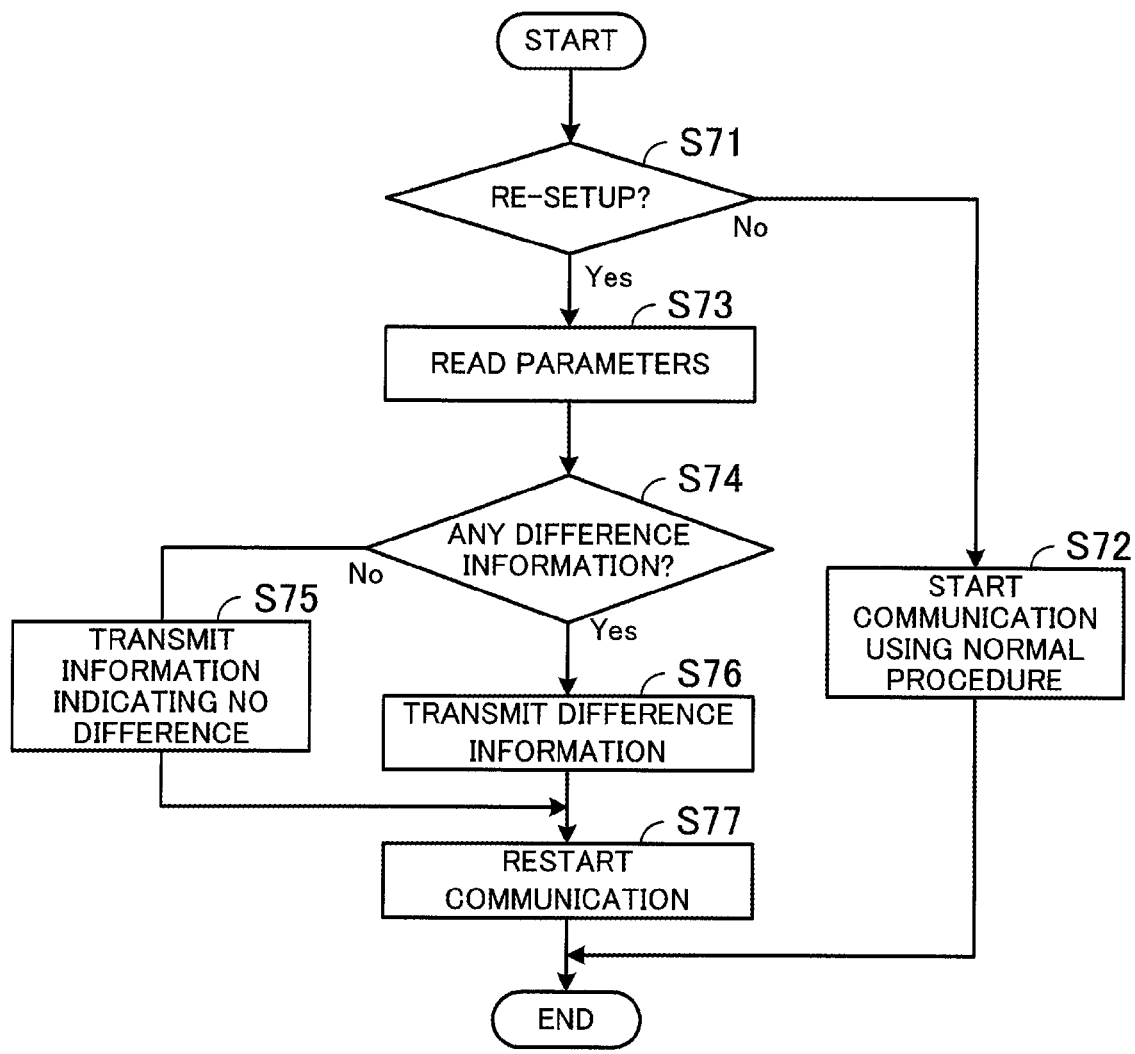
FIG. 14 is a flowchart of a process performed by the base station when restarting data communication.

FIG. 14 is a flowchart of a process performed by the base station when restarting data communication. The flowchart of a process performed by the base station when completing data communication is the same as the flowchart of FIG. 7, and a description thereof will be omitted.

(Step S71) The communication control unit 21b determines whether a Connection Re-setup is received from the radio terminal 12. If the communication control unit 21b determines that a Connection Re-setup is not received, the process proceeds to step S72. If the communication control unit 21b determines that a Connection Re-setup is received, the process proceeds to step S73.

Note that in the case of restarting communication within the validity period notified by the base station 11, the radio terminal 12 transmits a Connection Re-setup to the base station 11. On the other hand, in the case of restarting communication after expiration of the validity period notified by the base station 11, the radio terminal 12 transmits a Connection Request to the base station 11.

(Step S72) The base station 11 starts communication with the radio terminal 12 using a normal procedure. That is, the base station 11 establishes an RRC connection to the radio terminal 12, in accordance with the sequence illustrated in FIG. 3, and restarts communication.

(Step S73) The communication control unit 21b reads RRC parameters used for the previous communication from the storage unit 21c.

(Step S74) The communication control unit 21b compares the RRC parameters read from the storage unit 21c and the RRC parameters to be used for the current RRC parameters and determines whether there is difference information. If the communication control unit 21b determines that there is no difference information, the process proceeds to step S75. If the communication control unit 21b determines that there is difference information, the process proceeds to step S76.

(Step S75) The communication control unit 21b transmits to the radio terminal 12 information indicating that there is no difference information on the RRC parameters. For example, the communication control unit 21b transmits to the radio terminal 12 the information illustrated in FIG. 13.

(Step S76) The communication control unit 21b transmits to the radio terminal 12 the difference information on the RRC parameters. For example, the communication control unit 21b transmits to the radio terminal 12 the information illustrated in FIG. 12.

(Step S77) The communication control unit 21b restarts communication with the radio terminal 12, using the changed RRC parameters (the RRC parameters for the current communication).

Figure 15:
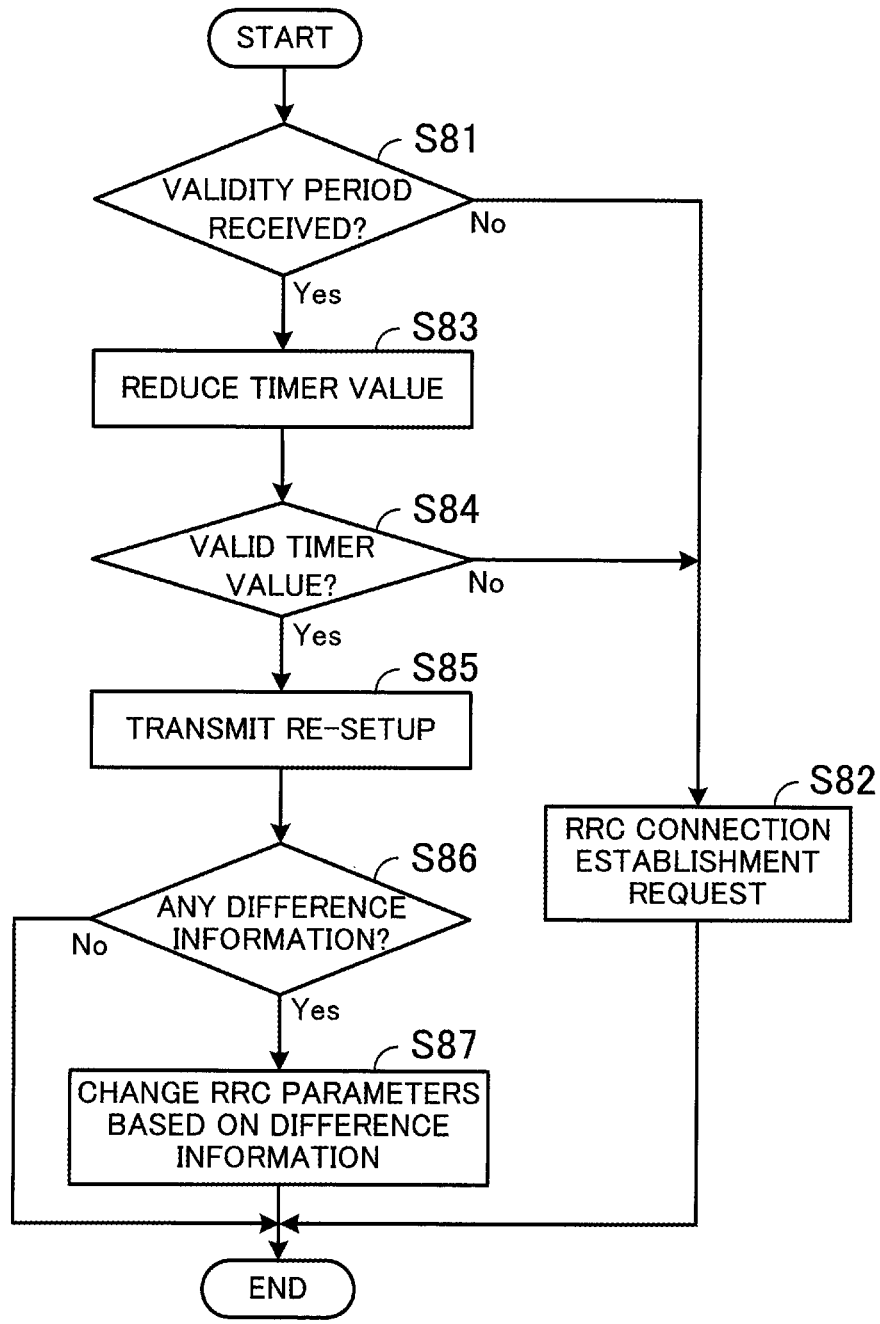
FIG. 15 is a flowchart of a process performed by the radio terminal when restarting data communication.

FIG. 15 is a flowchart of a process performed by the radio terminal when restarting data communication. The flowchart of a process performed by the radio terminal when completing data communication is the same as the flowchart of FIG. 9, and a description thereof will be omitted.

(Step S81) The validity period timer 31b determines whether a validity period is received together with a Connection Release by the communication control unit 31a. For example, the validity period timer 31b determines whether a validity period is received by the communication control unit 31a in step S42 of FIG. 9. If the validity period timer 31b determines that a validity period is not received together with the Connection Release by the communication control unit 31a, the process proceeds to step S82. If the validity period timer 31b determines that a validity period is received together with the Connection Release by the communication control unit 31a, the process proceeds to step S83.

(Step S82) The communication control unit 31a requests the base station 11 to establish an RRC connection. That is, the communication control unit 31a transmits a Connection Request to the base station 11.

(Step S83) The validity period timer 31b reduces the validity period set by the communication control unit 31a. For example, the validity period timer 31b subtracts 1 from the set value.

(Step S84) The validity period timer 31b determines whether the set value (timer value) is valid. For example, if the set value is not 0, the validity period timer 31b determines that the timer value is valid. If the validity period timer 31b determines that the timer value is valid, the process proceeds to step S85. If the validity period timer 31b determines that the timer value is invalid, the process proceeds to step S82.

(Step S85) The communication control unit 31a transmits a Connection Re-setup to the base station 11.

(Step S86) The communication control unit 31a receives a Msg4 from the base station 11. For example, the communication control unit 31a receives a Msg4 in step S61 of the sequence of FIG. 11.

The communication control unit 31a determines whether there is difference information on the RRC parameters, based on the received Msg4. For example, if the information illustrated in FIG. 12 is received in a Msg4, the communication control unit 31a determines that there is difference information on the RRC parameters. If the information illustrated in FIG. 13 is received in a Msg4, the communication control unit 31a determines that there is no difference information on the RRC parameters.

If the communication control unit 31a determines that there is difference information on the RRC parameters, the process proceeds to step S87. If there is no difference information on the RRC parameters, the communication control unit 31a performs data communication, using the RRC parameters stored in the storage unit 31c.

(Step S87) The communication control unit 31a updates the RRC parameters stored in the storage unit 31c, based on the difference information received from the base station 11. For example, the communication control unit 31a replaces, with the received difference information, a part of the RRC parameters in the storage unit 31c corresponding to the received difference information.

The communication control unit 31a performs radio communication with the base station 11, using the updated RRC parameters.

In this manner, if there is a change in the RRC parameters, the base station 11 transmits the difference, as difference information, to the radio terminal 12. The radio terminal 12 updates the RRC parameters, based on the received difference information. Thus, even if a change is made to the RRC parameters such as measurement conditions, the base station 11 and the radio terminal 12 are able to appropriately perform radio communication. Further, exchanging the difference information allows the base station 11 and the radio terminal 12 to reduce the amount of signaling, and thus allows the radio terminal 12 to reduce power consumption.

Figure 16:
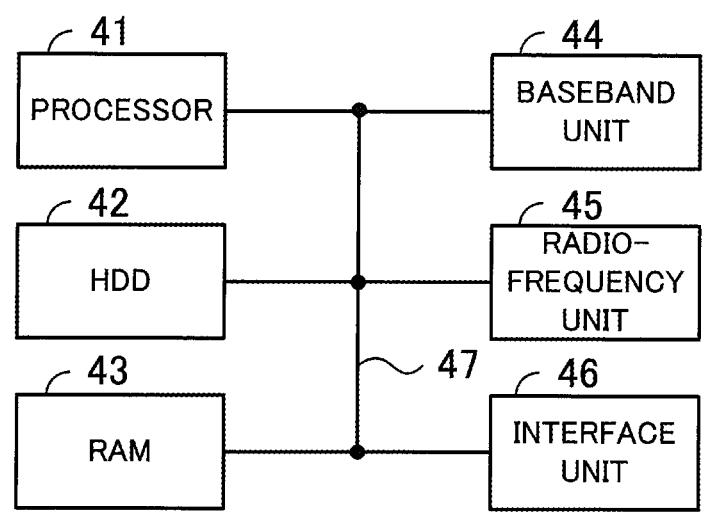
FIG. 16 illustrates an example of the hardware configuration of the base station.

FIG. 16 illustrates an example of the hardware configuration of the base station. As illustrated in FIG. 16, the base station 11 includes a processor 41, a hard disk drive (HDD) 42, a random access memory (RAM) 43, a baseband unit 44, a radio-frequency unit 45, an interface unit 46, and a bus 47.

The processor 41 is connected to the HDD 42, the RAM 43, the baseband unit 44, the radio-frequency unit 45, and the interface unit 46, via the bus 47. The entire operation of the base station 11 is controlled by the processor 41. Examples of the processor 41 include a central processing unit (CPU), a micro processing unit (MPU), and a digital signal processor (DSP).

The HDD 42 stores an operating system (OS) program, a program for controlling the validity period of RRC parameters and for controlling communication, and a program defining the operation of the base station 11. The RAM 43 temporarily stores part of or all the data and programs used for various types of processing performed by the processor 41.

The functions of the transmitting unit 1a and the communication unit 1b of FIG. 1 are realized by, for example, the processor 41. Further, the functions of the validity period calculation unit 21a and the communication control unit 21b of FIG. 4 are realized by, for example, the processor 41. The storage unit 21c is realized by, for example, the RAM 43.

The baseband unit 44 performs baseband processing on data to be transmitted to the radio terminal 12 and data received from the radio terminal 12. The baseband unit 22 of FIG. 4 corresponds to the baseband unit 44.

The radio-frequency unit 45 performs radio processing on data to be transmitted to the radio terminal 12 and data received from the radio terminal 12. The radio unit 23 of FIG. 4 corresponds to the radio-frequency unit 45.

The interface unit 46 communicates with a core network apparatus as a host apparatus or a server in a core network through, for example, wires.

The hardware configuration of the radio terminal 12 is the same as that of FIG. 16, except that the radio terminal 12 does not have the interface unit 46. The HDD 42 may be a flash memory. The functions of the receiving unit 2a and the communication unit 2b of FIG. 1 are realized by, for example, the processor 41. The functions of the communication control unit 31a of FIG. 5 are realized by, for example, the processor 41. The functions of the validity period timer 31b are realized by, for example, a timer that is not illustrated in FIG. 16. The storage unit 31c is realized by, for example, the RAM 43.

According to the disclosed apparatuses and methods, it is possible to reduce power consumption by the radio terminal.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A base station that performs radio communication with a radio terminal, the base station comprising:
   a transmitter which, when completing radio communication with the radio terminal, transmits to the radio terminal a predetermined period of control information on radio communication which has been used to communicate with the radio terminal; and
   a communicator which, when starting radio communication with the radio terminal within the predetermined period, starts radio communication with the radio terminal, using the control information used for previous radio communication.

2. The base station according to claim 1, wherein when the communicator has received a communication start request, the communication start request being transmitted from the radio terminal upon starting radio communication with the base station within the predetermined period, the communicator performs radio communication with the radio terminal, using the control information used for the previous radio communication.

3. The base station according to claim 2, wherein when the communicator has issued to the radio terminal a request for starting radio communication within the predetermined period, the communicator performs radio communication with the radio terminal, without receiving the communication start request from the radio terminal.

4. The base station according to claim 1, wherein the communicator transmits difference information on the control information to the radio terminal.

5. A radio terminal that performs radio communication with a base station, the radio terminal comprising:
   a receiver which, when completing radio communication with the base station, receives from the base station a predetermined period of control information on radio communication which has been used to communicate with the base station; and
   a communicator which, when starting radio communication with the base station within the predetermined period, starts radio communication with the base station, using the control information used for previous radio communication.

6. The radio terminal according to claim 5, wherein when starting radio communication with the base station within the predetermined period, the communicator transmits to the base station a communication start request for performing communication using the control information used for the previous radio communication.

7. The radio terminal according to claim 6, wherein when the communicator has received a request for starting radio communication from the base station within the predetermined period, the communicator does not transmit the communication start request.

8. The radio terminal according to claim 5, wherein the communicator receives difference information on the control information from the base station.

9. A radio communication system comprising:
   a base station; and
   a radio terminal;
   wherein the base station includes
      a transmitter which, when completing radio communication with the radio terminal, transmits to the radio terminal a predetermined period of control information on radio communication which has been used to communicate with the radio terminal, and
      a base station side communicator which, when starting radio communication with the radio terminal within the predetermined period, starts radio communication with the radio terminal, using the control information used for previous radio communication; and
   wherein the radio terminal includes
      a receiver which receives the predetermined period, and
      a radio terminal side communicator which, when starting radio communication with the base station within the predetermined period, starts radio communication with the base station, using the control information used for the previous radio communication.

* * * * *